J. VAN BRUNT.
FURNACE GRATE BAR.
APPLICATION FILED JULY 15, 1918.
1,409,205. Patented Mar. 14, 1922.
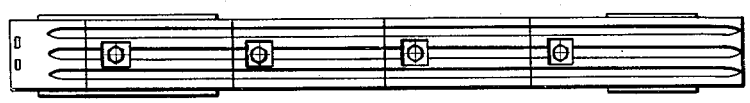
Fig. 1
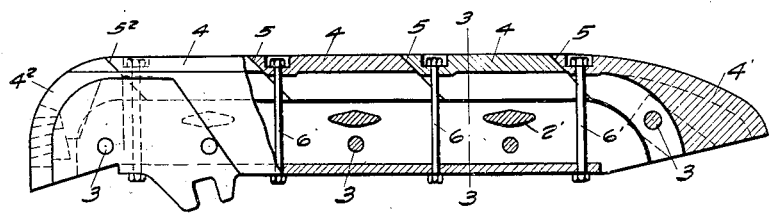
Fig. 2
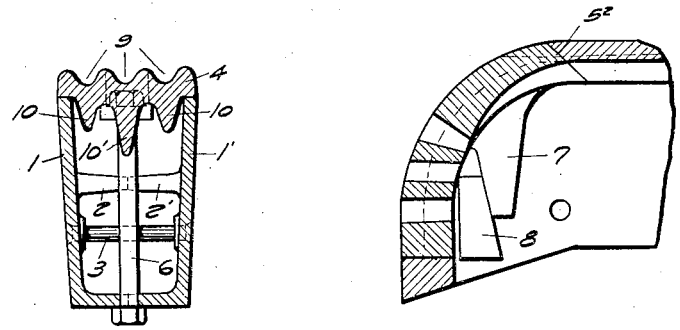
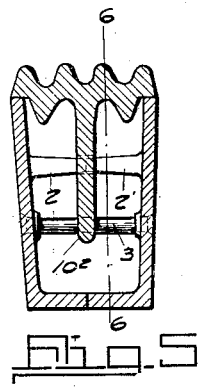
Fig. 5
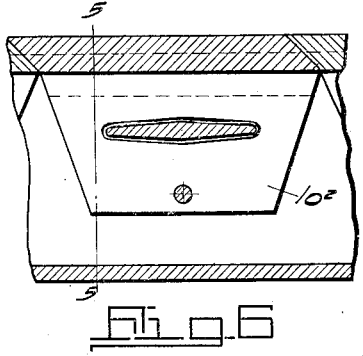
Fig. 6
INVENTOR.
John Van Brunt
BY
Bartlett Brownell
ATTORNEYS.

UNITED STATES PATENT OFFICE.

JOHN VAN BRUNT, OF NEW YORK, N. Y., ASSIGNOR TO COMBUSTION ENGINEERING CORPORATION, OF NEW YORK, N. Y., A CORPORATION OF NEW YORK.

FURNACE GRATE BAR.

1,409,205.            Specification of Letters Patent.     Patented Mar. 14, 1922.

Application filed July 15, 1918. Serial No. 244,862.

*To all whom it may concern:*

Be it known that I, JOHN VAN BRUNT, a citizen of the United States, residing at the city, county, and State of New York, have invented a certain new and useful Improvement in Furnace Grate Bars, of which the following is a full, clear, and exact description.

My invention relates to improvements in furnace grate bars and has for its object to provide a built-up tubular grate bar suitable for use in stokers, such as described in Patent No. 818,010, granted to W. R. Wood, April 17, 1906, such that burned out portions can be easily replaced. It further has for its object to produce a built-up grate bar in which the upper portion thereof shall be provided with longitudinally extending projections through which the swelling or blossoming effect due to superficial burning shall be locally confined so as to reduce the expansion of the top portion as a whole. It further has for its object a grate bar provided with interior vanes acted upon by the air passing through the tubular member so as to impart the heat of the top member more rapidly to said air, thus accomplishing the two very desirable ends of more thoroughly heating the air and cooling the top of the grate bar.

The following is a description of an embodiment of my invention, reference being had to the accompanying drawings, in which, Fig. 1 shows a plan view of a grate bar embodying my invention;

Fig. 2 shows a view partly in side elevation and partly in longitudinal section;

Fig. 3 shows a transverse section of the bar on the line 3—3, Fig. 2;

Fig. 4 shows a longitudinal section on the left hand end of the bar;

Figs. 5 and 6 show a modification, Fig. 5 being a transverse section on the line 5—5 Fig. 6, and Fig. 6 showing a partial longitudinal section on the line 6—6 Fig. 5.

Referring more particularly to the drawings, 1—1' are two counterpart castings provided with spacing abutments 2—2' and held together by bolts 3 so as to provide a trough-like member. Upon the top of this trough-like member is supported the top portion of the grate bar, the same comprising a plurality of intermediate sections 4 provided with engaging inclined surfaces 5 so that the right hand sections overlap the left hand sections as shown in Figs. 1 and 2 and secured to the trough-like member by bolts 6 passing through the sections adjacent to their left hand ends and through the bottom of the trough-like member. In addition to these intermediate sections are two end sections 4'—4². The end section 4' is held in place by a bolt 6' and one of the bolts 3, while the end section 4², which contains the tuyere openings, is provided with downwardly depending lugs 7 which engage co-acting lugs 8 carried by the castings 1 and 1' so as to be held in position by reason of the downward pressure of the adjoining top section upon the surface 5².

The upper surfaces of the top sections of the grate bar have their outer edges inwardly inclined and are provided with a plurality of grooves 9 which extend longitudinally. The ridges forming these grooves are subject to the highest degree of heat, while the bottoms of the grooves are relatively well protected and are below the ordinary burning point, with the result that any swelling or blossoming due to the burning of the top of the grate bar is practically confined to the upper portions of the ridges, and inasmuch as there are a plurality of ridges this swelling or blossoming is distributed locally throughout the breadth of the bar rather than accumulated at the edges of the bar. The swelling of the top surface of the bar, as a whole, is therefore materially reduced by the ridges and grooves thus provided.

The lower surface of the top sections are provided with downwardly extending projections 10—10', in line with the external grooves, the central projection being preferably longer than the outside projection. The air passing through the tubular grate bar comes in contact with these internal projections, which results in imparting heat from the top sections of the grate bars to the passing air more rapidly than if the surface were a plain surface, thus maintaining the grate bar cooler and also more highly heating the hair.

In the construction shown in Figs. 5 and 6 the construction is similar, except that the intermediate members are provided with still longer central extensions, as shown at 10² and so disposed that the spacing abutments 2—2' and the bolts 3 pass through them so that the sections are held in place without the use of the vertical bolt 6. The construction has the same features of construction which result in reducing the evils of swelling or blossoming and increase the cooling effect due to the air passing through the tubular bars.

In both forms by removing the bolts burned out top portions can be removed and replaced.

As will be evident to those skilled in the art, my invention permits various modifications without departing from the spirit thereof or the scope of the appended claims.

What I claim is:

1. In a tubular grate bar having inlet and discharge ports on its under side for receiving air at one end and discharging it in heated condition at the other, the combination of a trough-like base portion and a removable top therefor, and bolts securing said top to said trough-like portion, said top being impervious to air and provided on its bottom surface with heat radiating vanes.

2. In a tubular grate bar having inlet and discharge ports on its under side for receiving air at one end and discharging it in heated condition at the other, the combination of a trough-like base portion and a removable top therefor, and bolts securing said top to said trough-like portion, said top being impervious to air and provided on its top and bottom surfaces with longitudinally extending grooves and ridges, the ridges on the under surface being in line with the grooves on the upper surface.

3. In a tubular grate bar having inlet and discharge ports on its under side for receiving air at one end and discharging it in heated condition at the other, the combination of a trough-like base portion and a removable top therefor, bolts securing said top to said trough-like portion, said trough member comprising two longitudinally extending castings having abutting spacing portions below said removable top, and means for holding said castings together, said means being located below said spacing portions.

4. In a tubular grate bar having inlet and discharge ports on its under side for receiving air at one end and discharging it in heated condition at the other, the combination of a trough-like member, intermediate sections forming a top covering the central part of the trough of said member, removable end sections secured to said trough-like member and extending into line with the axis of said trough, the passage through said tubular bar opening downward between said trough and said end sections, and means for securing said intermediate and end sections in position.

5. A grate of the class described having, in combination, a plurality of hollow grate bars constructed to receive air at one end and discharge the air from their other end to the fuel, having a plurality of inwardly projecting heat radiating vanes on the lower side of the top portion of their walls to assist in heating the air as it passes through the bars to the fuel and having the top portion of their inner walls impervious to air.

JOHN VAN BRUNT.